United States Patent Office 3,578,545
Patented May 11, 1971

3,578,545
FLEXIBLE ODOR-LIBERATING LAMINATE
Richard M. Carson and Reuben R. Saeks, Dayton, Ohio, assignors to Carson-Saeks, Inc., Dayton, Ohio
No Drawing. Continuation-in-part of application Ser. No. 433,991, Feb. 19, 1965. This application Aug. 19, 1968, Ser. No. 753,704
Int. Cl. A61l 9/04
U.S. Cl. 161—86
8 Claims

ABSTRACT OF THE DISCLOSURE

The present invention relates to laminates of flexible, transparent, porous plastic films to which is cemented absorbtive fabric or felt impregnated with an odoriferous material, such as a perfume, which slowly passes through the pores of the plastic film thus giving objects in contact therewith an agreeable odor over relatively long periods of time.

---

This application is a continuation-in-part of United States application Ser. No. 433,991 filed Feb. 19, 1965, now abandoned.

Plastic films of various types, and laminates thereof, have been used in the past for various purposes, and particularly in the packaging industries. Frequently, printed or decorative designs have been applied to the surfaces of the films to make them more attractive for certain purposes.

Attempts have also been made in the past to make such films odoriferous so as to give added utility to the films. Packages wrapped in such film give off odors of different types over extended periods of time and thus increase the attractiveness and saleability of the products wrapped therein. For example, products can be wrapped with films impregnated with perfumes suggestive of the products. It has also been found that plastic films impregnated with perfumes or other odoriferous materials serve as desirable liners for drawers in which clothes or other objects are stored, as well as for the walls and shelves of closets and the like.

In the past, the only practical method of producing odoriferous plastic films has been by using special methods for producing porous plastic films and then impregnating the especially prepared pores thereof with the desired perfumes or other odoriferous material. Such methods of producing odoriferous plastic films, however, have been both expensive and highly impractical because of the inability to regulate the degree of porosity of the films as desired for different perfumes as well as for different purposes.

In accordance with the present invention, the previous difficulties in production of odoriferous plastic films are readily and economically overcome, in that special procedures for production of special types of porous films are unnecessary, it being possible to use commercial grades of plastic films readily available on the market. In addition, by means which will be subsequently described, the type and amount of odoriferous material can be readily varied, as desired, to give odoriferous films suitable for different purposes. It is thus possible both to vary the odor liberated by the film and the length of time that the odor will be liberated.

The above desired results are attained in accordance with the present invention by cementing one surface of a porous flexible plastic film to a flexible fabric or sheet or pad of woven or unwoven absorptive material capable of absorbing the desired odoriferous material. The latter may be added to the absorptive material either before or after the absorptive fabric, sheet or pad is cemented to the plastic film. The resulting laminate can be rolled or otherwise suitably packaged so as to obviate substantial loss of the odoriferous material until used. When unrolled and used as a packaging material, as a liner for drawers or for the lining of closets, or the like, the odoriferous material in the absorptive sheet or pad slowly vaporizes and passes through the pores of the plastic film into the surrounding air.

In preparing the odoriferous laminate of the present invention, any plastic film having suitable physical characteristics can be used. It is essential that the particular film used have sufficient plasticity or flexibility to permit its use in the form of the finished laminate as a packaging material, for the lining of drawers or the like, or which can be readily passed over curved or broken surfaces without cracking. It is also essential that the plastic film used have sufficient porosity to permit the particular odoriferous material used to pass slowly through the film. In this connection, it might be noted that films which have sufficient porosity for satisfactory passage of certain odoriferous materials may not have sufficient porosity for satisfactory passage of other odoriferous materials. It is highly important, therefore, that for a particular odoriferous material and for a particular use, a plastic film of the desired porosity be selected. This selection can readily be made in various ways. For example, it is well known that porosity of a film varies with its thickness, chemical composition and method of production. In connection with the latter point, it is well known that while all grades of polyethylene film are porous, the high density type of polyethylene is decidedly less porous than the more common low density variety.

While the degree of porosity of a particular film will vary with the type of odoriferous material used and some types of odoriferous material may not be able to pass through pores in the film through which other odoriferous materials readily pass, the relative porosity of different types and different thicknesses of film can be readily determined by comparing the rates of transmission of gases such as oxygen and carbon dioxide through the films. Such comparative values are known for many films of different types and, hence, from such known values the suitability of a given film for a given odoriferous material can readily be determined without necessity for extensive trials.

Certain films having sufficient plasticity or flexibility do not possess sufficient porosity to give satisfactory laminates for the purposes of the present invention. Similarly, other films having satisfactory porosity do not have satisfactory plasticity or flexibility to permit use of the finished laminates as wrappings or for use as liners where corners or similar surfaces are to be covered. For use in preparing the laminates of the present invention, it has been found that, in general, low, medium, and high density polyethylene, unoriented polypropylene, certain polyvinyl chloride and certain rubber hydrochloride films can be used. However, from the point of view of general utility, as well as economy, it has been found that low density polyethylene films of 0.001 inch thickness give very satisfactory results. It must be kept in mind also that certain of the above specified films are decidedly less porous than others and, hence, when using such films it is necessary to select the more readily vaporizable odoriferous materials in order for a reasonable amount of the odoriferous material to pass through the pores of the film.

An indication of the degree of porosity of the above specified film can be determined from the following table:

| | Gas transmission, cc./mil/ 1 sq. meter/24 hr./1 atmos./ 73 deg. F., 0% R.H.[1] | |
| --- | --- | --- |
| | $O_2$ | $CO_2$ |
| Rubber hydrochloride | 130–1,300 | 520–5,200 |
| Low density polyethylene, 0.910–0.925 | 3,900–13,000 | 7,700–77,000 |
| Medium density polyethylene, 0.926–0.940 | 2,600–5,200 | 7,700–13,000 |
| High density polyethylene, 0.941–0.965 | 520–3,900 | 3,900–10,000 |
| Polypropylene (unoriented) | 1,300–6,400 | 7,700–21,000 |

[1] ASTM D 1434.

The porous film used should preferably be transparent, although this is not essential for all possible uses. For many uses, it is desirable also that the film be decorative or contain printed matter which will be visible. When printed or decorative designs are desired, these can be applied by any conventional method to one surface of the film, preferably on the surface to which the absorptive material is to be cemented, and should preferably be printed in reverse so as to appear correct when seen through the transparent film. The method of applying such printed or design matter constitutes no part of the present invention and is well known to those skilled in the art.

The absorptive sheet or pad of fabric or felt, which may be either woven or unwoven material and which is cemented to the surface of the porous film can also be varied in both composition and thickness, depending upon the odoriferous material used and the use to which the finished laminate is to be applied, the length of time which it is desired for the laminate to emit odor, and like factors. In general, any sheet or pad of fabric or felt material can be used which will absorb and subsequently liberate at a suitable rate through the pores of the film the odoriferous material used. In general, nonabsorptive materials or those which would render the finished laminate unduly stiff are not satisfactory since they either do not retain or do not liberate at a correct rate, the odoriferous material or else render the laminate so stiff that it cannot be satisfactorily used for many purposes. These requirements make it impractical to use fabrics, sheets, pads or felt composed of glass, asbestos, nylon or the like. Cotton or wool in the form of fabrics, sheets, felt or pads have been found to be particularly satisfactory in making the laminates of the present invention. The thickness of the sheet or pad is critical only to the extent that it be sufficiently thick to retain a sufficient amount of the odoriferous material and not render the finished laminate relatively inflexible. For most purposes, a relatively thin sheet of non-woven cotton in the form of fabric or paper sheets have been found to be particularly satisfactory. For most purposes, it has been found desirable to use a sheet or pad which is relatively soft and gives a cushioning effect to the finished laminate.

The type of adhesive used for cementing the absorptive sheet or pad to the film is critical only to the extent that it is frequently necessary to vary the type of adhesive with the type of film used, special types of cement being required for certain types of film. With polyethylene film and cotton sheets or fabrics, for example, it has been found that polyisobutylene, or mixtures of polyisobutylene with other materials as disclosed in British patent 859,728, are eminently satisfactory, although other known adhesives suitable for such purposes may be equally satisfactorily used. With other types of films and other types of fabrics, sheets or pads still other types of known adhesives will be found preferable.

The odoriferous materials, or perfumes, are preferably used in the liquid state since solid materials, in general, are not vaporized sufficiently rapidly through the pores of the film to be practical. Solid materials also present additional problems in obtaining uniform distribution and absorption on the fibers of the fabric or felt pad. Examples of suitable odoriferous materials which can be effectively used in the laminate of the present invention include oil of lavender, oil of petitgrain, oil of rosemary, citral and ethyl cinnamate. When a bouquet mixture of odoriferous materials is used, it is highly important that the mixture be made up of different oils which vaporize and pass through the pores of the film at approximately the same rate so as not to affect undesirably the odor given off by the film, since quite obviously the early vaporization of the more volatile oils would result in a change in the odor over a period of time.

It is also important that the odoriferous material be compatible with both the adhesive used in cementing the fabric or felt to the film and to the printing ink used in applying any printing or printed design to the surface of the film. Lack of compatibility can result in undesirable changes in the printing or design and in the reduction of the adhesion of the sheet or pad to the film, and even to changes in the odor given off from the sheet or pad.

In preparing the laminate of the present invention, if printing or a decorative design is desired on the film, this is first applied to the transparent, porous, flexible film by any of the conventional printing, or other, processes, it being applied in reverse on the side of the film to which the absorptive sheet is to be subsequently applied. After drying, the desired adhesive is applied over the printing or design and the absorptive fabric, sheet or pad is applied to the adhesive and bonded therewith to the film, using pressure, if desired or necessary to effect uniform bonding between the fabric, sheet or pad and the film. It is obviously essential that the adhesive not be used in an amount which would serve to close any substantial proportion of the pores in the film. Normally, a quite thin coating of the adhesive is adequate for satisfactory bonding.

It is sometimes desirable to bond the edges of the absorptive fabric, sheet or pad to the film. When this is desired, effective bonding of the edges can be effected by including in the fabric, sheet or pad thermoplastic fibers and passage of the laminate in contact with a roll heated to a sufficiently high temperature to fuse the thermoplastic fibers against a film. When the sheet or pad contains no thermoplastic fibers, effective bonding is normally effected by passing the laminate through the nip formed by two rolls, or other suitable pressure means.

The impregnation of the odoriferous material, or perfume, with the absorptive sheet or pad can be effected either before or after the latter is cemented to the film, any suitable conventional method of impregnation being employed. Suitable means for accomplishing this comprise the application of the odoriferous material by immersion, spray, doctor blades or rolls, using a suitable solvent for the odoriferous material, if necessary. The use of rolls has been found to be particularly effective since this method permits application of regulated amounts of odoriferous material to different types of fabrics, sheets or pads without undue losses of materials.

There are certain operating advantages in carrying out the impregnation step subsequent to the cementation of the sheet or pad to the film. This method reduces to a minimum losses in odoriferous materials since the film-sheet or pad-laminate can first be prepared and stored in roll form and the latter can be unrolled and impregnated with the odoriferous material by roll or other application means just prior to sale.

If the fabric or pad is impregnated with the odoriferous material prior to cementation to the film, it is essential that the latter operation be effected in a manner so that undue losses of the odoriferous material from the fabric or felt does not take place. In such cases, it is desirable that the cementation not be effected with a thermoplastic cement, or that the impregnated laminate not be subjected to excessive heat which would tend to drive off the odoriferous material.

While particular embodiments of the invention have been illustrated and described, it will be obvious to one skilled in the art that various changes and modifications in the described invention can be made without departing from the basic concept thereof. It is intended, therefore, that the appended claims cover all such changes and modifications that fall within the true spirit and scope of the disclosed invention.

What is claimed is:

1. Flexible odor-liberating laminate comprising a flexible plastic sheet sufficiently porous to permit the slow passage of odoriferous materials therethrough and to one surface of which is cemented an absorptive fabric impregnated with an odoriferous material.

2. Flexible odor-liberating laminate according to claim 1 wherein the plastic sheet is selected from the group consisting of polyethylene, unoriented polypropylene, polyvinyl chloride and rubber hydrochloride films.

3. Flexible odor-liberating laminate according to claim 1 wherein the plastic sheet is a low density polyethylene film.

4. Flexible odor-liberating laminate according to claim 1 wherein the absorptive fabric cemented to said plastic sheet is selected from the group consisting of fabrics, sheets, pads and felts of cotton and wool which may be woven or unwoven.

5. Flexible odor-liberating laminate according to claim 1 wherein said absorptive fabric is cemented to said plastic film by means of polyisobutylene.

6. Flexible odor-liberating laminate according to claim 1 wherein the edges of said absorptive fabric are heat sealed to said plastic film.

7. Flexible odor-liberating laminate according to claim 1 wherein said absorptive fabric is impregnated with an oily odoriferous material selected from the group consisting of oil of lavender, oil of petitgrain, oil of rosemary, citral and ethyl cinnamate.

8. Flexible odor-liberating laminate according to claim 1 wherein said absorptive material is impregnated with said oily odoriferous material subsequent to cementation of said absorptive fabric to said plastic film.

References Cited

UNITED STATES PATENTS

| | | | |
|---|---|---|---|
| 246,335 | 8/1881 | Page | 424—29X |
| 2,656,297 | 10/1953 | Davis et al. | |
| | | | 161 Isobutylene Digest |
| 3,131,113 | 4/1964 | Arbit et al. | 161—151 |
| 3,216,882 | 11/1965 | Feldt et al. | 161—109 |

ROBERT F. BURNETT, Primary Examiner

R. H. CRISS, Assistant Examiner

U.S. Cl. X.R.

161—88, 159; 239—53, 56